(12) United States Patent
Maier et al.

(10) Patent No.: US 12,311,307 B2
(45) Date of Patent: May 27, 2025

(54) FILTER ELEMENT FOR USE IN A FILTER AND FILTER HAVING A FILTER ELEMENT

(71) Applicant: SATA GmbH & Co. KG, Kornwestheim (DE)

(72) Inventors: Norbert Maier, Allmersbach (DE); Martin Horstman, Stuttgart (DE); Sven Schulze, Gemmrigheim (DE)

(73) Assignee: SATA GmbH & Co. KG, Kornwestheim (DE)

( * ) Notice: Subject to any disclaimer, the term of this patent is extended or adjusted under 35 U.S.C. 154(b) by 380 days.

(21) Appl. No.: 17/763,568

(22) PCT Filed: Sep. 9, 2020

(86) PCT No.: PCT/EP2020/075203
§ 371 (c)(1),
(2) Date: Mar. 24, 2022

(87) PCT Pub. No.: WO2021/058282
PCT Pub. Date: Apr. 1, 2021

(65) Prior Publication Data
US 2022/0370944 A1    Nov. 24, 2022

(30) Foreign Application Priority Data

Sep. 25, 2019 (DE) ............ 20 2019 105 323.2

(51) Int. Cl.
*B01D 46/24* (2006.01)
*B01D 29/96* (2006.01)
(Continued)

(52) U.S. Cl.
CPC ..... *B01D 46/2414* (2013.01); *B01D 46/0005* (2013.01); *B01D 29/96* (2013.01);
(Continued)

(58) Field of Classification Search
None
See application file for complete search history.

(56) References Cited

U.S. PATENT DOCUMENTS

D51,386 S    10/1917   King
2,297,285 A    9/1942   Bledsoe
(Continued)

FOREIGN PATENT DOCUMENTS

CN    101616723 A    12/2009
CN    102029085 A    4/2011
(Continued)

OTHER PUBLICATIONS

European Office Action dated Jul. 20, 2023 for European Application No. 20 771 265.4.
(Continued)

*Primary Examiner* — Jason M Greene
(74) *Attorney, Agent, or Firm* — Paul D. Bianco; Fleit Intellectual Property Law; Katharine Davis Wong (57) ABSTRACT

A filter element, in particular a replaceable filter element, more particularly for separating particles and/or gases and/or liquids, in particular a filter cartridge for use in a filter, more particularly a compressed air filter, in particular as a component of a filter comprising multiple filtration stages, includes a substantially tubular body with an annular end face that faces a filter head, an underside, and a circumferential surface. Multiple, preferably four, retaining arms, running radially in relation to the central axis, are provided in the region of the end face and a toroidal filter-element sealing surface is provided on the end face, and the retaining arms protrude in relation to the filter-element sealing surface. The filter element is usable in a filter.

17 Claims, 8 Drawing Sheets

(51) Int. Cl.
*B01D 35/30* (2006.01)
*B01D 46/00* (2022.01)

(52) U.S. Cl.
CPC ...... *B01D 35/303* (2013.01); *B01D 2201/295* (2013.01); *B01D 2201/4076* (2013.01); *B01D 2265/06* (2013.01); *B01D 2271/022* (2013.01); *B01D 2271/027* (2013.01)

(56) References Cited

U.S. PATENT DOCUMENTS

| | | | |
|---|---|---|---|
| D204,588 S | 5/1966 | Laub | |
| 3,598,243 A | 8/1971 | Gutkowski | |
| 3,727,333 A | 4/1973 | Ward | |
| 3,745,965 A | 7/1973 | Lyung | |
| 4,192,750 A | 3/1980 | Elfes | |
| 4,615,800 A | 10/1986 | Stifelman | |
| 4,818,385 A | 4/1989 | Medley | |
| D306,754 S | 3/1990 | Petrucci | |
| 5,325,707 A | 7/1994 | Slater | |
| D388,468 S | 12/1997 | Rife | |
| D393,490 S | 4/1998 | Burch | |
| 5,876,610 A | 3/1999 | Clack | |
| 6,224,751 B1 | 5/2001 | Hofmann et al. | |
| D454,615 S | 3/2002 | Neal | |
| 6,387,156 B1 | 5/2002 | Richardson | |
| 6,467,481 B1 | 10/2002 | Eswarappa | |
| 6,843,377 B1 | 1/2005 | Roll | |
| D507,871 S | 8/2005 | DiMarchi | |
| 7,232,253 B2 | 6/2007 | Isbitsky et al. | |
| D547,826 S | 7/2007 | Kennedy | |
| D547,827 S | 7/2007 | Kennedy | |
| 7,563,299 B2 | 7/2009 | Baptista de Costa | |
| D621,001 S | 8/2010 | Maziel | |
| 7,882,961 B2 | 2/2011 | Menez et al. | |
| 7,896,959 B1 | 3/2011 | Schopf | |
| 7,909,999 B2 | 3/2011 | Noh | |
| 8,021,618 B1 | 9/2011 | Cooper | |
| 8,096,423 B2 | 1/2012 | Menez | |
| D658,233 S | 4/2012 | Byford | |
| 8,147,576 B2 | 4/2012 | Gillenberg | |
| 8,268,170 B2 | 9/2012 | Core | |
| 8,365,924 B2 | 2/2013 | Solkolchik | |
| 8,440,081 B2 | 5/2013 | Wieczorek | |
| 8,474,631 B2 | 7/2013 | Kocksch | |
| 8,524,079 B1 | 9/2013 | Tseng | |
| 8,920,530 B2 | 12/2014 | Ruhland et al. | |
| 9,108,131 B2 | 8/2015 | Thalmann | |
| 9,212,635 B2 | 12/2015 | Von Merkatz | |
| 9,314,138 B2 | 4/2016 | Conrad | |
| D760,321 S | 6/2016 | Kruse | |
| D768,812 S | 8/2016 | Kruse | |
| D792,554 S | 7/2017 | Kruse | |
| D793,524 S | 8/2017 | Kruse | |
| D794,752 S | 8/2017 | Kruse | |
| 10,118,117 B2 | 11/2018 | Schwartz | |
| 10,124,284 B2 | 11/2018 | Kruse | |
| 10,625,184 B2 | 4/2020 | Stamey, Jr. | |
| 10,737,208 B2 | 8/2020 | Schwartz | |
| 11,318,398 B2 | 5/2022 | Stamey, Jr. | |
| 2002/0029733 A1 | 3/2002 | Timmons | |
| 2002/0174774 A1 | 11/2002 | Chen | |
| 2004/0025880 A1 | 1/2004 | Capon | |
| 2004/0201485 A1 | 10/2004 | Dermody | |
| 2004/0240324 A1 | 12/2004 | Isbitsky et al. | |
| 2005/0035036 A1 | 2/2005 | Moretto | |
| 2005/0160911 A1 | 7/2005 | Friday | |
| 2005/0229561 A1 | 10/2005 | Nepsund | |
| 2006/0144766 A1 | 7/2006 | Felmeri et al. | |
| 2007/0023333 A1 | 2/2007 | Mouhebaty | |
| 2007/0079589 A1 | 4/2007 | Elkstrom | |
| 2007/0095744 A1 | 5/2007 | Bagci | |
| 2007/0267338 A1* | 11/2007 | Menez | B01D 29/96 210/348 |
| 2008/0047132 A1 | 2/2008 | Wieczorek | |
| 2008/0060975 A1 | 3/2008 | Young | |
| 2010/0294274 A1 | 11/2010 | Poirier | |
| 2011/0132816 A1 | 6/2011 | Vasilescu | |
| 2013/0256206 A1* | 10/2013 | Thalmann | B01D 46/2414 210/232 |
| 2014/0077949 A1 | 3/2014 | Brinkley | |
| 2014/0124459 A1 | 5/2014 | Li | |
| 2014/0144111 A1 | 5/2014 | Campbell | |
| 2014/0237763 A1 | 7/2014 | Holsten | |
| 2015/0273381 A1 | 10/2015 | Stoner | |
| 2016/0023152 A1 | 1/2016 | Kruse | |
| 2017/0120168 A1* | 5/2017 | Stamey, Jr. | B01D 29/21 |
| 2018/0214803 A1 | 8/2018 | Li | |
| 2019/0168141 A1* | 6/2019 | Yoshimura | B01D 29/96 |
| 2022/0347616 A1* | 11/2022 | Maier | B01D 46/2414 |

FOREIGN PATENT DOCUMENTS

| | | |
|---|---|---|
| CN | 102089057 A | 6/2011 |
| CN | 103154491 A | 6/2013 |
| CN | 103534446 A | 1/2014 |
| CN | 105263600 A | 1/2016 |
| CN | 205517053 U | 8/2016 |
| CN | 106948983 A | 7/2017 |
| DE | 19819098 A1 | 11/1999 |
| DE | 10297296 T5 | 9/2004 |
| DE | 202007014822 U1 | 2/2009 |
| DE | 112007001879 T5 | 9/2009 |
| DE | 102008046499 A1 | 3/2010 |
| DE | 102009008450 A1 | 8/2010 |
| DE | 102013003304 A1 | 10/2013 |
| DE | 102018001635 A1 | 9/2019 |
| EP | 0858825 A1 | 8/1998 |
| EP | 1 405 145 B1 | 4/2004 |
| EP | 1405145 | 4/2004 |
| EP | 2 604 154 A1 | 6/2013 |
| WO | 02/00552 A2 | 1/2002 |
| WO | 03/007088 | 1/2003 |
| WO | 2003/007088 A2 | 1/2003 |
| WO | 2010/04315 A2 | 1/2010 |
| WO | 2012/150506 A2 | 11/2012 |
| WO | 2012/151749 A1 | 11/2012 |
| WO | 2014/057323 A1 | 4/2014 |
| WO | 2019/166599 A1 | 9/2019 |
| WO | 2021/058281 A1 | 4/2021 |

OTHER PUBLICATIONS

European Office Action dated Jul. 21, 2023, for European Application No. 20 771 521.0.
International Preliminary Report on Patentability with Written Opinion dated Mar. 15, 2022, for PCT/EP2020/075188.
International Preliminary Report on Patentability with Written Opinion dated Mar. 15, 2022, for PCT/EP2020/075203.
For Chinese Application No. 2020800670543: First Office Action dated Feb. 11, 2023 Search Report dated Feb. 11, 2023.
International Search Report and Written Opinion for PCT/EP2020/75203, filed Sep. 9, 2020.
International Search Report and Written Opinion for PCT/EP2020/075188 filed Sep. 9, 2020.
Office Action dated Feb. 12, 2024 for U.S. Appl. No. 17/763,530.
Office Action dated Sep. 27, 2017, from U.S. Appl. No. 14/807,933.
Notice of Allowance dated Aug. 29, 2018, from U.S. Appl. No. 14/807,933.
1 German Search Report dated Feb. 22, 2016 for Application No. 20 2015 005 244.4.
For Chinese Patent Application No. 202080067071.7: Search Report dated Sep. 24, 2023 Office Action dated Sep. 26, 2023.
Response filed May 13, 2024 for U.S. Appl. No. 17/763,530.
Second Office Action, dated May 7, 2024, for Chinese Patent Application No. 2020800670717.
Notice of Allowance dated Jul. 12, 2024 for U.S. Appl. No. 17/763,530.

* cited by examiner

FILTER ELEMENT FOR USE IN A FILTER AND FILTER HAVING A FILTER ELEMENT

FIELD OF THE INVENTION

The invention relates to a filter element, in particular an exchangeable filter element, in particular for separating particles and/or gases and/or liquids, in particular a filter cartridge, for use in a filter, in particular a compressed air filter, in particular as part of a filter having a plurality of filter stages. The filter element comprises a substantially tubular body, having an annular end side which faces a filter head, a lower side which is spaced apart from the end side and faces away from the filter head, a circumferential face which extends along a central axis, in particular a rotation axis, wherein the circumferential face connects the front side and the bottom to one another. Provided in the region of the end side are a plurality of, preferably four, holding arms which run radially to the central axis, wherein an annular filter element sealing face is likewise provided on the end side.

Furthermore, the invention relates to a filter having such a filter element.

BACKGROUND

Filter elements are typically used to filter free-flowing media within a filter. Such media can be gases, for example, but also liquids such as water or fuel or the like. The medium to be filtered flows through the filter elements, whereby impurities are separated. Such a filter element typically has a body, situated in which is a filter medium through which the flow occurs. Typically, a filter head is provided, by way of which the fluid to be filtered is supplied and the filtered fluid is discharged. Comparable filter elements moreover have fastening devices by way of which the filter elements can be fastened relative to the filter head in order to seal the filter head by way of a sealing member. For this purpose, the filter element can be screwed directly to the filter head, for example. Another type of attachment takes place by way of a filter sleeve or a filter pot, wherein the filter element is placed in the filter sleeve and bears on the closed end of the filter sleeve. The closed end of the filter cartridge here forms a counter bearing for the filter head, wherein the filter element is braced between the filter head and the counter bearing.

A filter element mentioned at the outset is known from US 2007/0095744 A1. This is a fluid filter having a replaceable filter cartridge having a tubular body, a closed end, and an annular open end side. Furthermore provided are holding arms which lie in depressions in the open side of the filter sleeve, wherein the holding arms are offset to the rear from the filter element sealing face on which the filter element seals toward the filter head.

SUMMARY

One aspect of the invention is based on providing a filter element having mountings which are improved in terms of construction.

Advantageous design embodiments are disclosed herein.

A filter element according to the invention can be designed as an exchangeable filter element, in particular for separating particles and/or gases and/or liquids, in particular in the form of a filter cartridge, for use in a filter.

The filter element comprises a substantially tubular body having an annular face that faces a filter head. Furthermore provided is a lower side which is spaced apart from the end side and faces away from the filter head.

The filter element moreover has a circumferential face which extends along a central axis, in particular a rotation axis, and connects the end side and the lower side to one another. Provided in the region of the end side are a plurality of, preferably four, holding arms running radially to the central axis. The (circular) annular filter element sealing face is provided on the end side, wherein the holding arms project in relation to the filter element sealing face. The holding arms here serve to position the filter element and as mountings of the filter cartridge, and thus unequivocally establish the position of the filter cartridge in relation to the filter head. This makes it possible for the filter element to have an incident flow, as has been established above in terms of construction.

Thanks to the holding arms projecting in relation to the filter element sealing face, there is a favorable introduction of force. Furthermore, the projecting holding arms protect the filter element sealing face from damage during transport or during handling/assembling of the filter element. Moreover, material accumulations during production can be prevented.

If an unequivocal rotational position is desired, at least one of the holding arms can be designed differently from the other holding arms, the former in this instance engaging in a corresponding receptacle installation on the filter cartridge.

The holding arms can be substantially L-shaped in cross section. The holding arms can also project outwards in the radial direction in relation to the filter element sealing face. It can also be advantageous if the holding arms project radially outwards on the circumferential face. A particularly advantageous fastening of the filter element to the filter head can be provided by holding arms designed in this manner.

The holding arms are preferably fixedly connected to the filter element sealing face, preferably configured so as to be integral to the filter element sealing face. This makes it possible to establish the position of the holding arms in relation to the filter element sealing face, which ultimately enables optimal positioning of the filter element in relation to the rest of the filter.

It is particularly advantageous if the holding arms have in each case a support face which points in the opposite direction of the filter element sealing face, preferably wherein the support face is convexly curved. The convex curvature of the support face runs in the axial direction, wherein the support faces adjoin the free ends of the holding arms and have a length of at least 3 millimeters and at most 10 millimeters in the radial direction. This enables a particularly advantageous transmission of force between the holding arms and the filter element sealing face. Furthermore, it is easier to receive the holding arms in a corresponding recess.

In addition, centering ramps can be provided at the transition between the holding arms and the circumferential face. The centering ramps here, from the circumferential face in the direction of the holding arms, extend at an angle of between 70° and 5°, preferably between 20° and 40°, to the central axis. The centering ramps connect the circumferential face and the support faces to one another. The positioning of the filter element relative to the filter head and in the filter sleeve is facilitated by the centering ramps, or said filter element is centered in the filter sleeve and kept at a spacing from latter, respectively.

The holding arms may also have an end face which is situated at that exposed end of the holding arms that in the radial direction points away from the circumferential face.

The spacing between the center of the filter element sealing face and the end face is preferably between 12 and 18 millimeters in the radial direction, wherein the spacing from the center of the filter element sealing face can also be between 14 and 16 millimeters. The smallest spacing between the filter element sealing face and the support faces in the axial direction is between 0 and 4 millimeters, preferably between 1 and 2 millimeters. The largest spacing between the filter element sealing face and the support faces is between 4 and 6 millimeters. A particularly stable fit of the holding arms in a corresponding recess is guaranteed as a result of this dimensioning of the holding arms. Furthermore, the end faces serve as a gripping region for removing the filter elements from the surrounding filter sleeve and thus make it easier to change the filter elements.

Furthermore, the filter element can be designed in such a manner that substantially only axial forces act on the filter element sealing face, preferably wherein the holding arms form a counter bearing in relation to the axial forces. The axial forces resulting from the compression of the sealing member which bears on the filter element sealing face are created herein. The holding arms can be flexible in the axial direction and serve as a compensating element between the sealing member and the receptacle installations for the holding arms.

Moreover, the sealing member rests against the (circular) annular filter element sealing face of the filter element in such a manner that the sealing member between the filter head and the filter element separates an external space, which is situated outside of the filter element, from an internal space, which is situated inside the filter element. As a result, this separates a clean gas space from a raw gas space and achieves a particularly advantageous connection between the filter element and the filter head.

As a further design feature, a substantially tubular filter sleeve having an open filter sleeve end side that faces the filter head and a filter sleeve outside that runs along the lateral surface can be provided, preferably wherein the filter sleeve surrounds the filter element and delimits the latter from the environment. Moreover, the filter sleeve end side can have receptacle installations for the holding arms, wherein the filter element is in contact with the filter sleeve only by way the holding arms disposed in the receptacle installations and is otherwise designed to be freely suspended in the filter sleeve. Such a connection between the filter head, the filter cartridge and the filter sleeve can be implemented with a particularly small number of additional parts and using simple geometries, and is therefore particularly cost-effective.

The receptacle installations can be formed at least by continuous incisions, which begin at the filter sleeve end side and run radially to the central axis; the receptacle installations preferably receive the holding arms. Inter alia, the ends of the incisions can form counter bearings which are concave in shape to match the convex support faces of the holding arms. The counter bearings absorb the forces that are created by the compression and the pressure load on the sealing member. This interaction between receptacle installations and holding arms enables a particularly simple positioning of the filter element, wherein a compensation for dimensional deviations is at the same time created in addition to the sealing member.

The sealing member can be an axially acting seal. Moreover, the filter sleeve by means of a radial seal can seal toward the filter head. In order to form a closed space about the filter element, the filter sleeve can be designed in the shape of a pot and accordingly be closed at the end that faces away from the filter head. On the one hand, this form of sealing enables simple assembly of the filter cartridge and, on the other hand, it can be implemented in a particularly space-saving manner.

At least two of the receptacle installations can be configured as receptacle locking installations which serve for receiving the holding arms and receiving retaining bolts. These retaining bolts are preferably attached to the filter head and can be aligned radially to the central axis.

The receptacle locking installations are advantageously designed in such a manner that the retaining bolts interact with the receptacle locking installations in the manner of a bayonet closure. Such a configuration enables the filter element to be changed particularly easily, wherein a sufficient axial movement for bracing the sealing member is enabled at the same time.

For the implementation of the bayonet closure, the receptacle locking installations, in addition to the axial incisions of the receptacle installations, can have a fastening extension which is preferably formed by a further incision that starts from the axial incisions and runs substantially in the circumferential direction about parts of the filter sleeve. In addition, the fastening extension can have a latching undercut, which is formed by a concavity in the end region of the fastening extension proximal to the filter head. A bayonet closure designed in this manner can be manufactured particularly inexpensively and enables the filter sleeve to be particularly securely fastened to the filter head, this fastening being self-securing when the filter is impinged by pressure by way of the latching undercut.

A further embodiment relates to a filter having at least two filter stages. The filter elements have different filter properties, for example. The sealing arrangements for sealing between the filter elements and the filter heads are preferably of a substantially identical design. Additionally or alternatively, the receptacle installations of the filter sleeves and the holding arms of the filter elements can be of a substantially identical design.

In such a filter, the seals between the filter element and the filter head, as well as the sealing faces proximal to the filter element and the sealing faces proximal to the filter head, the receptacle installations of the filter sleeves, or the holding arms of the filter elements of the different filter stages can be of an identical design.

A filter element of this type, or the sealing arrangement between the filter element and filter head is conceived so that the filter element or the sealing arrangement can be impinged with higher pressure from the outside than from the inside. Preferably, at least one of the filter elements or one of the sealing arrangements of the entire filter is pressurized in reverse. As a result, a uniform construction of the different filter stages can be provided. Furthermore, with this construction, the filter elements can be stressed or passed through by a flow both from the outside in and from the inside out. One of the filter elements is preferably passed through by a flow in the radial direction from the inside to the outside, and another filter element is preferably passed through by a flow from the outside to the inside, i.e. toward the central axis.

Such a sealing arrangement can be used in particular in the region of compressed air filters, for example as part of a filter having a plurality of filter stages, for fluid-tight sealing between a filter element and a filter head. Such a filter element is preferably a filter cartridge.

This sealing arrangement comprises an annular elastic sealing member, a filter head and filter element sealing face. The sealing member has a filter head side that faces the filter head sealing face, an opposite filter element side that faces the filter element sealing face, an internal face encircling the inside and an opposite external face encircling the shell face. The filter head side comprises an encircling first concavity between the internal face and the external face, wherein the filter element side has an encircling second concavity between the internal face and the external face. The filter head side, at least in regions, bears in an encircling manner on the filter head sealing face, wherein the filter element side, at least in regions, bears in an encircling manner on the filter element sealing face. The filter head sealing face and the filter element sealing face are composed of at least one encircling inner partial face and one encircling outer partial face.

The partial faces of the filter head sealing face and the partial faces of the filter element sealing face here ascend toward the center between the partial faces in such a manner that the mutual spacing between the inner partial faces decreases from the inside to the outside and the spacing between the outer partial faces decreases from the outside to the inside, substantially in the direction of the central axis of the sealing member. The partial faces interact with the concavities in such a manner that, when impinged with pressure, the sealing member, proceeding from the internal face and/or the external face, in the direction of the acting force is wedged between the inner partial faces and/or the outer partial faces.

As a result of the partial faces ascending toward the center, a central constriction is created between the filter head sealing face and the filter element sealing face, which from the center between the two partial faces expands outwards on both sides. This constriction interacts with a corresponding taper of the sealing member. If the sealing member is impinged with pressure from the internal face or the external face, the sealing member is pressed against the oblique flanks of the constriction that are situated on the side of the applied force. The sealing member herein is so inflexible that, when used as intended, it cannot be compressed so much by the applied pressure that the sealing member in the direction of the force is squeezed through the constriction.

As a result of the sealing member being squeezed into the constriction, wedging or a greater compression of the sealing member between the opposite sealing faces results, this in turn leading to an increase in the sealing effect. This occurs both in the case of a resultant impingement with pressure on the part of the outer circumferential face and on the part of the inner circumferential face.

The sealing effect increases in a self-acting manner when the load from the internal face or the external face increases.

In particular, the seal seat between the partial faces and the concavities is reinforced when there is a pressure differential between the internal face and the external face as a result of the interaction between the acting force and the wedge effect. If, due to a pressure differential on the internal or external face of the sealing member, greater pressure is exerted on the sealing member than on the opposite face, the sealing member is pressed in the direction of the applied force, wherein the space between the partial faces is decreased in this direction. The wedge effect results from the interaction between the acting force and the constriction between the filter head sealing face and the filter element sealing face. As a result of the wedge effect, the seal is increasingly pressed against these partial faces, whereby the sealing effect increases as the pressure difference increases.

Moreover, the ramp-type design makes it easier to position the seal or the filter element relative to the filter head.

It is particularly advantageous if the sealing member on the filter head side has an encircling retaining groove for receiving a retaining element. In particular, the retaining element is designed in such a manner that, when interacting with the retaining groove, a releasable latching connection is created, wherein the latching connection holds the filter head side of the sealing member so as to bear on the filter head sealing face. The retaining groove runs here runs in the region of the concavity, preferably in the base of the first concavity. The retaining element projects between the two partial faces of the filter head sealing face. The retaining element preferably projects from the filter head sealing face along a circular ring. As a result of a latching connection of this type, the sealing member can be reliably held on the filter head, wherein a replacement of the sealing member, for example in the event of damage, is particularly facilitated.

It is also particularly advantageous if the second concavity extends at least over half, preferably more than two thirds, of the width of the filter element side between the internal face and the external face. Additionally, the first concavity can also extend at least over half, preferably more than two thirds, of the width of the side of the filter head between the internal face and the external face. A particularly good seal seat can be guaranteed by a configuration of this type, because two almost linear sealing faces are created and a susceptible surface pressure is thus prevented.

It is therefore also particularly advantageous if the sealing member in an encircling sub-region of the second concavity, preferably in the region of the lowest point of the second concavity, does not bear on the filter element sealing face. It is of particular advantage if the sealing member at least in regions does not bear on the sealing member in the region that is closest to the filter head sealing face. Thus, a first outer and a second inner sealing face which have similar sealing properties can be achieved, as a result of which it is guaranteed that the seal can withstand loads that are comparable on both sides.

The retaining element and the holding groove can be designed in such a manner that there is a seal seat between the bottom of the holding groove and the area of the retaining element which is closest to the filter element sealing face. This is preferably achieved in that the depth of the retaining groove in the axial direction in the non-assembled state of the sealing member is less than the height of the retaining element in the axial direction. This makes it possible to produce an annular seal with a small face, the latter sealing in a fluid-tight manner even in the event of a weak compression of the sealing member.

The latching connection can be formed by a unilateral extension on the retaining element and a corresponding recess in the sealing member, wherein the extension in the radial direction projects outwards toward a central axis of the sealing member. In this instance, the opposite side of the retaining element has no convexity and is planar in the direction of the central axis. Thus, the retaining element is substantially L-shaped in cross section. A retaining element designed in this manner guarantees that the service life of the sealing member is maximized, because the retaining groove is only stressed on the outside.

It is particularly advantageous if the sealing member has a hardness between 60 Shore A and 90 Shore A, preferably between 60 Shore A and 80 Shore A, particularly preferably 70 Shore A. This guarantees that the sealing member is sufficiently elastic for adequate sealing between the sealing faces and at the same time is stiff enough to guarantee the wedge effect to the required extent.

It is also advantageous if partial faces of the filter head sealing face and/or the filter element sealing face in the radial direction to the central axis have a mutual internal angle α of less than 180°, preferably between 130° and 170°, relative to one another. A particularly advantageous range is between 145° and 155°. As a result of these angles, a particularly advantageous distribution of the acting forces and the creation of the wedge effect can be guaranteed.

It is likewise particularly advantageous if the filter head side of the sealing member has two annular encircling partial sealing faces, the retaining groove therebetween extending into the sealing member, and both partial sealing faces in the radial direction to the central axis are at an external angle $α_1$ of less than 180°, preferably between 125° and 175°. A particularly advantageous range here is between 140° and 150°. This guarantees an optimal interaction between the sealing faces proximal to the filter head and the partial sealing faces on the filter head side of the sealing member and thus a high sealing effect and the creation of the wedge effect.

It is likewise advantageous if the second concavity in the non-assembled state in the direction of the central axis has a greater depth than the height offset of the partial faces. The height offset of the partial face is to be understood here as the distance over which the partial faces extend in the axial direction counter to the filter head. The height of the partial faces is preferably less than 70% of the depth of the second concavity. Provided as a result of the greater depth of the second concavity is a clearance between the filter head sealing face and the filter element sealing face, which compensates for inaccuracies in the mutual positioning of the two surfaces.

In a further particularly preferred exemplary embodiment, the sealing arrangement is designed for use in a filter, the filter element of which is attached to the filter head along an assembly axis which runs parallel to, or is identical to, the central axis of the sealing member. This enables a particularly simple assembly and disassembly of the filter element.

A filter head of a corresponding filter preferably has a hollow-cylindrical filter sleeve end side recess which extends from the side of the end side and substantially so as to be axially symmetrical to the central axis of the filter element into the filter head and accommodates the filter sleeve end side. In this instance the filter sleeve end side recess in the radial direction to the central axis is situated outside the filter head sealing face. This enables a particularly compact construction mode.

Furthermore, a corresponding filter head can have two retaining bolt bores which run radially to the central axis and which preferably lie opposite one another, the retaining bolt bores accommodating retaining bolts which are part of the bayonet closure. A metal-to-metal cone seal for sealing in relation the environment is preferably provided between the retaining bolts and the filter head. A particularly simple and cost-effective manufacture is enabled as a result of this design.

It can likewise be particularly advantageous if the sealing arrangement is designed in such a manner that the inner face and outer face of the sealing member come to bear neither proximal to the filter head nor proximal to the filter element. Accordingly, the sealing member substantially seals off the filter head sealing face and the filter element sealing face only by way of axially acting forces. Such an axially sealing seal also enables a particularly simple assembly and disassembly of the filter element, since a significantly smaller distance in the axial direction is necessary in order to achieve a sufficient sealing effect.

Insofar as this is relevant for the corresponding explanation, the above explanations basically assume the installed state of the filter element having a compressed sealing member. In this state, the sealing member seals between an internal space and an external space. It was explicitly mentioned should an embodiment refer to the disassembled state with a non-compressed sealing member.

A filter according to the invention may have only the main features as well as any combination of the further features described. Furthermore, the various features of the exemplary embodiments can be combined with one another in an arbitrary manner, even among different exemplary embodiments. Besides, the invention relates to a filter having a described filter element as well as to a filter having a described sealing arrangement, as well as to the sealing arrangement and the filter element per se, or any combination of the filter element and the sealing arrangement.

BRIEF DESCRIPTION OF THE DRAWINGS

The invention will hereinafter be explained by means of the figures described. In the figures.

DETAILED DESCRIPTION

Figure 1:
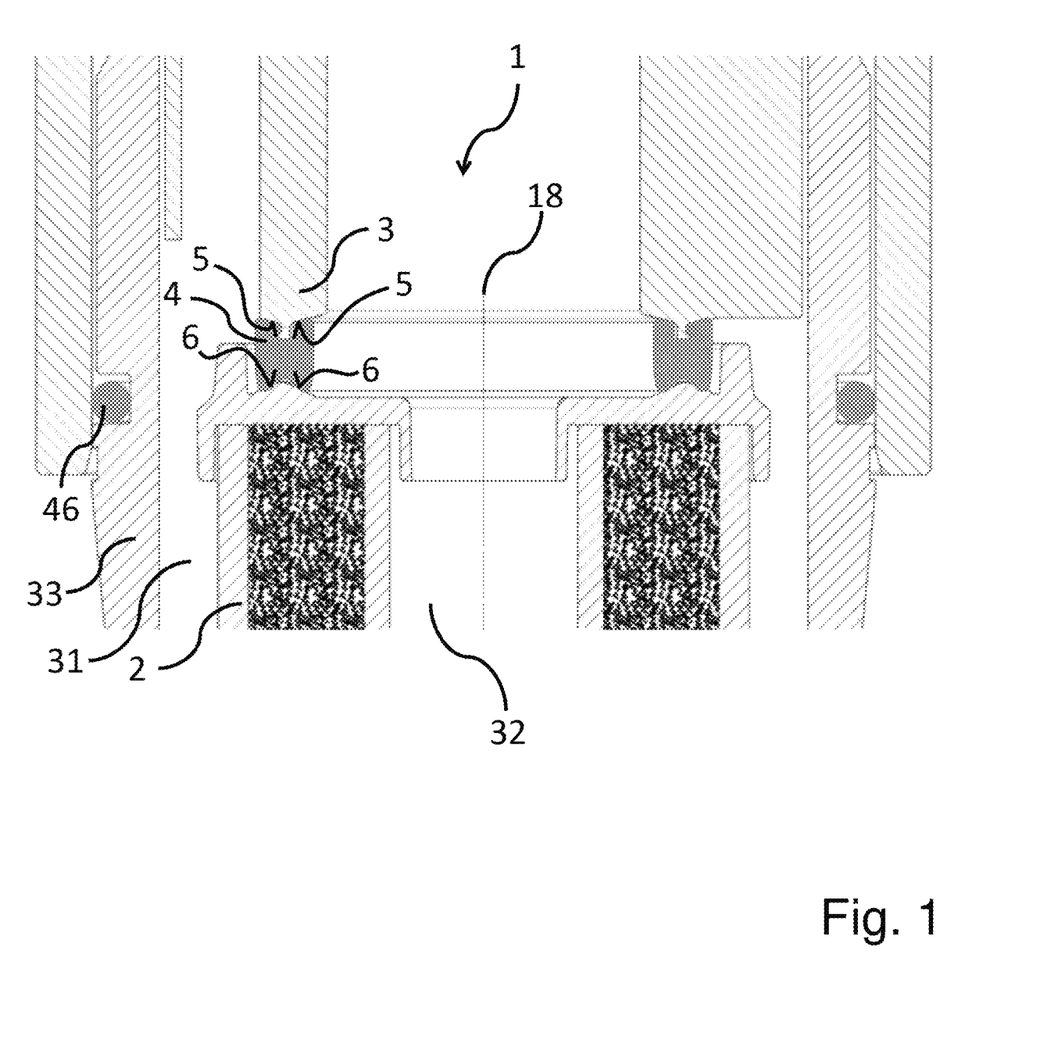
FIG. 1 shows a fragment of a sectional view of a filter stage having a sealing arrangement and a filter element.
Figure 2:
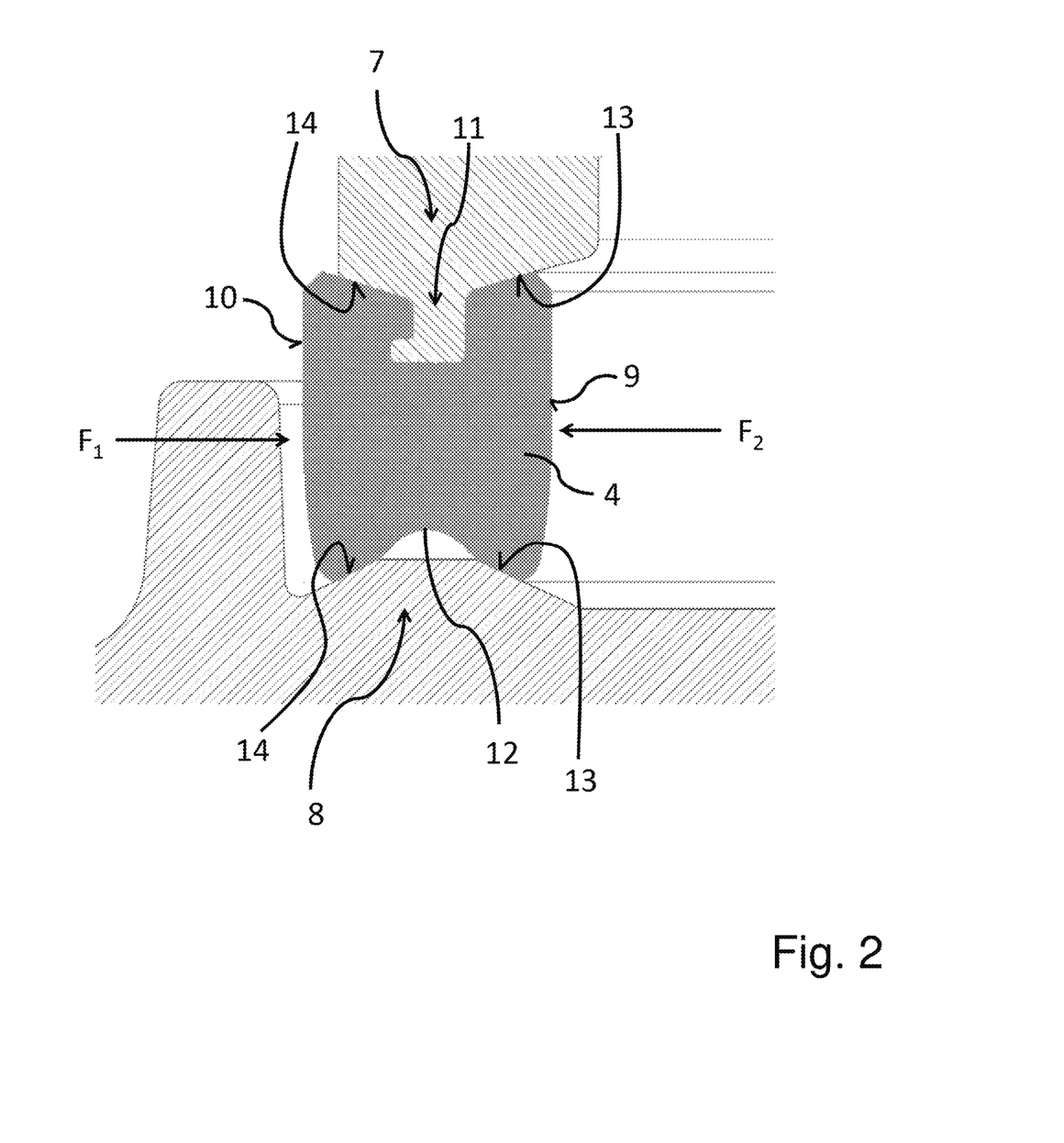
FIG. 2 shows a fragment of a sectional view of a sealing arrangement.

Shown in FIGS. 1 and 2 is a sealing arrangement 1 for a filter, in particular a compressed air filter, in particular as part of a filter having a plurality of filter stages 45, for the fluid-tight sealing between a filter element 2, in particular a filter cartridge, and a filter head 3. Furthermore shown is an annular, elastic sealing member 4 and a filter head and filter element sealing face 5, 6.

The sealing member 4 has a filter head side 7 that faces the filter head sealing face 5, an opposite filter element side 8 that faces the filter element sealing face 6, an internal face 9 encircling the inside, and an opposite external face 10 encircling the shell face. The filter head side 7 has an encircling first concavity 11 between the inner face 9 and the outer face 10, wherein the filter element side 8 also has an encircling second concavity 12 between the inner face 9 and the outer face 10.

The filter head sealing face 5 and the filter element sealing face 6 are composed of at least one encircling inner partial face 13 and one encircling outer partial face 14. It can be seen from the drawings that the filter head side 7, at least in regions, bears in an encircling manner on the filter head sealing face 5, and the filter element side 8, at least in certain regions, bears in an encircling manner on the filter element sealing face 6. The partial faces 13, 14 of the filter head sealing face 5 and the partial faces 13, 14 of the filter element sealing face 6 here ascend toward the center between the partial faces 13, 14 in such a manner that the mutual spacing of the inner partial faces 13 decreases from the inside outwards and the spacing between the outer partial faces 14 decreases from the outside inwards, in the axial direction toward the central axis 18. It can likewise be seen that the inner face 9 and outer face 10 of the sealing member 4 come to bear neither proximal to the filter head nor proximal to the filter element and accordingly only seal axially to the central axis 18.

Furthermore shown is a radial seal 46 which between the filter head 3 and the filter sleeve 33 seals the filter toward the environment or toward the surrounding atmosphere. This seal 46 is a seal 46 which substantially seals by way of forces acting radially to the central axis 18.

Figure 4:
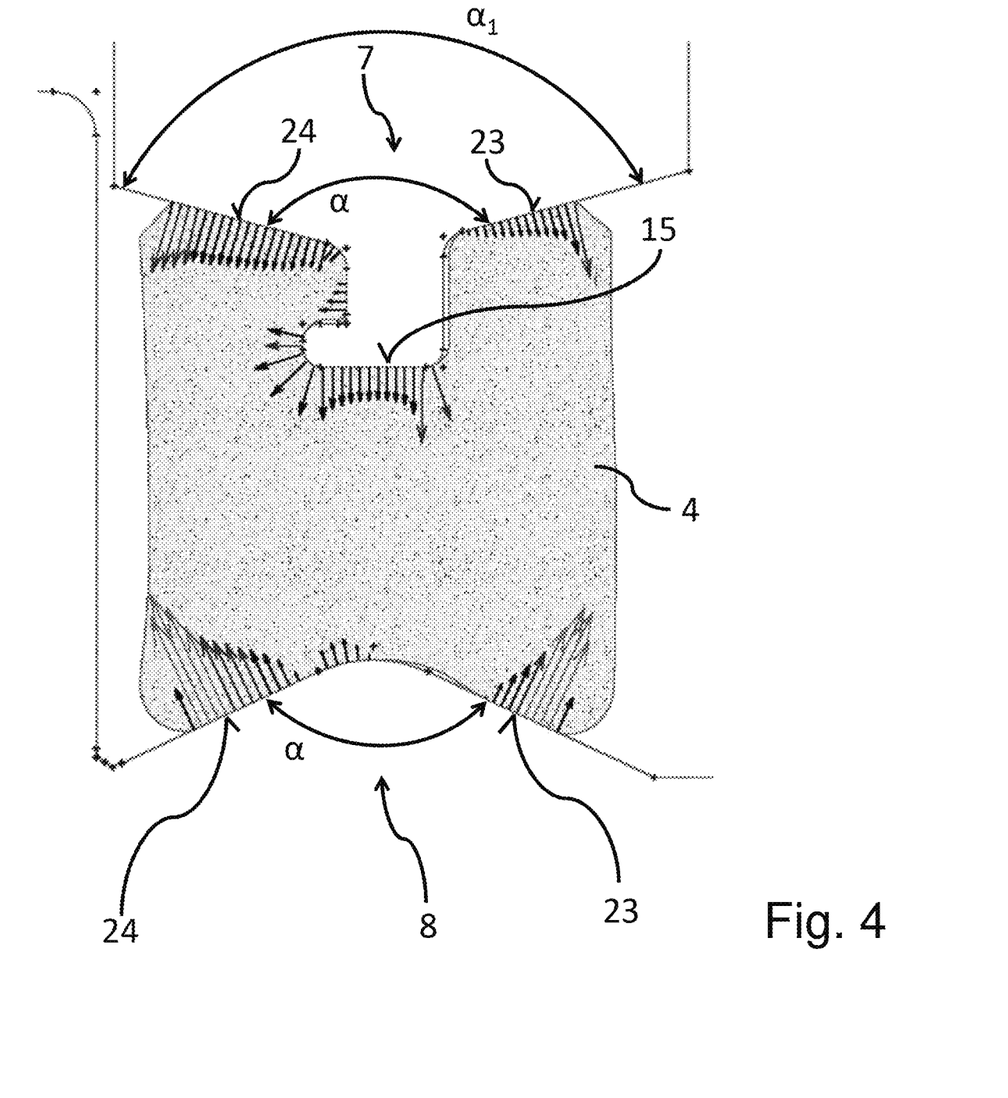
FIG. 4 shows a force action diagram of a sealing member stressed axially and circumferentially.

As can likewise be seen from FIGS. 1 and 2, the partial faces 13, 14 interact with the concavities 11, 12 in such a manner that, when impinged with pressure, the sealing member 4, proceeding from the inner face 9 and/or the outer face 10, is wedged in the direction of the acting force $F_1$, $F_2$, between the inner faces 13 and/or the outer faces 14 wedged. As a result of this wedging effect, the seal seat between the partial faces 13, 14 and the concavities 11, 12 is reinforced, wherein the acting force $F_1$, $F_2$ is created only when there is a pressure difference between the inner face 9 and the outer face 10. The forces that act on the sealing faces 5, 6 when the outer face $F_1$ of the sealing arrangement 1 is stressed, are illustrated in FIG. 4.

As can furthermore be derived from FIG. 1, the sealing arrangement 1 is configured for use in a filter, wherein the assembly of the filter element 2 on the filter head 3 takes place along an assembly axis which runs so as to be identical to the central axis 18 of the sealing member 4.

The sealing member 4 bears on the annular filter element sealing face 6 of the filter element 2 and between the filter head 3 and the filter element 2 separates an external space 31, which is situated outside of the filter element 2, from an internal space 32, which is situated inside the filter element 2.

Figure 3:
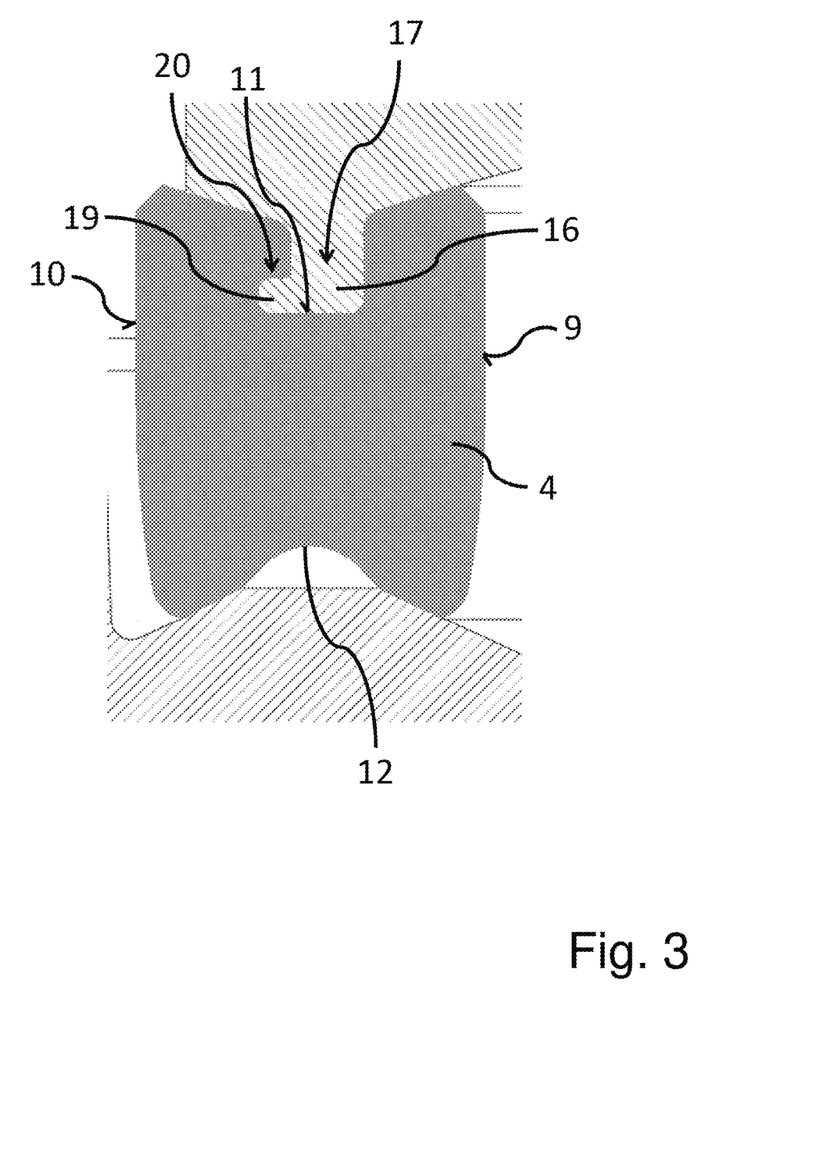
FIG. 3 shows an enlarged fragment of a sectional view of a sealing arrangement.

In FIG. 3 it is shown that the sealing member 4 on the filter head side 7 has an encircling retaining groove 15 for receiving a retaining element 16. The retaining element 16 is designed in such a manner that, when interacting with the retaining groove 15, a releasable latching connection 17 is created. The latching connection 17 holds the filter head side 7 so as to bear on the filter head sealing face 5, wherein the retaining groove 15 runs in the region of the concavities 11, 12, preferably in the base of the first concavity 11. The retaining element 16 projects between the two partial faces 13, 14 of the filter head sealing face 5. In particular, the retaining element 16 projects along a circular ring in relation to the filter head sealing face 5.

The second concavity 12 extends at least over half, preferably more than two thirds, of the width of the filter element side 8 between the inner face 9 and the outer face 10. The first concavity 11 extends at least over half, here over more than two thirds, of the width of the filter head side 7 between the inner face 9 and the outer face 10.

In an encircling sub-region of the second concavity 12, which is preferably situated in the region of the lowest point of the second concavity 12, the sealing member 4 does not bear on the filter element sealing face 6. As can be seen, the sealing member 4 does not bear in that region that is closest to the filter head sealing face 5.

As can likewise be seen from FIG. 3 and also from FIG. 4, the retaining element 16 and the retaining groove 15 are designed in such a manner that a there is a seal seat between the base of the retaining groove 15 shown in FIG. 4 and that region of the retaining element 16 that is closest to the filter element sealing face 6. This is achieved in that the depth of the retaining groove 15 of the seal in the non-assembled state of the sealing member 4 is at least as great as the height of the retaining element 16 in the direction of the central axis 18, preferably less than the height of the retaining element 16.

It is furthermore shown that the latching connection 17 is formed by a unilateral extension 19 on the retaining element 16 and a corresponding recess 20 in the sealing member 4. The extension 19 in the radial direction projects outwards to a central axis 18 of the sealing member 4 shown in FIG. 1. The opposite side of the retaining element 16 has no convexity and is flat in the direction of the central axis 18. The retaining element 16 is substantially L-shaped, this being shown in a mirror-inverted manner in FIG. 3.

The sealing member 4 shown moreover has a hardness between 60 Shore A and 80 Shore A, preferably 70 Shore A.

In FIG. 4 it is shown that the partial faces 13, 14 of the filter head sealing face 5 and the filter element sealing face 6 in the radial direction to the central axis 18 are at a mutual internal angle α of less than 180°, preferably between 130° and 170°. Furthermore, the filter head side 7 of the sealing member 4 has two annular encircling partial sealing faces 23, 24, between which the holding groove 15 extends into the sealing member 4. Both partial sealing faces 23, 24 in the radial direction to the central axis 18 have a mutual external angle $α_1$ of less than 180°, preferably between 125° and 175°.

Because the sealing member 4 in FIG. 4 is shown in the compressed state, it is obvious that the second concavity 12 in the non-assembled state has a greater depth in the direction of the central axis 18 than the partial faces 13, 14 in the direction of the filter head 3 extend toward the center between the two partial faces 13, 14. For example, a shown compression of the sealing member 4 is achieved when the height of the partial faces 13, 14 is less than 70% of the depth of the second concavity 12.

As can be seen from the distribution of forces and the exposed inner and outer faces 9, 10, the sealing member 4 is an axially acting seal which seals substantially only by way of axially acting forces.

Figure 5:
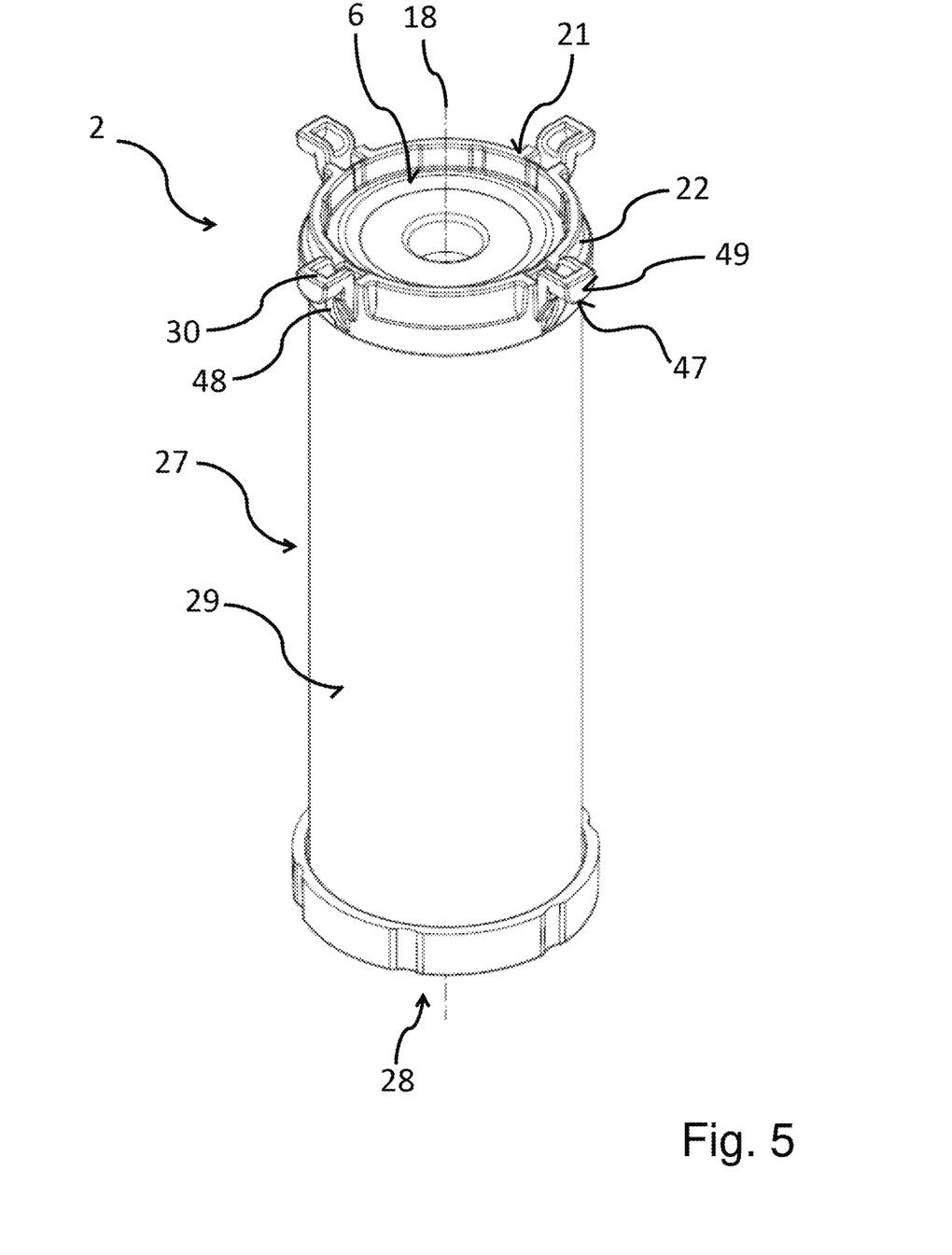
FIG. 5 shows a perspective view of a filter element.

Shown in FIG. 5 is a corresponding filter element 2 which is illustrated here as a filter cartridge. The filter element 2 has a filter element sealing face 6 which is set back from an end side 21 of the filter element 2. In other words, the end side 21 is formed by an encircling collar 22 that projects in relation to the filter element sealing face 6.

The filter element 2 shown is an exchangeable filter element 2 which can be used to separate particles and/or gases and/or liquids. In particular, this is a filter cartridge that can be conceived for use in a filter, in particular a compressed air filter. The filter may be equipped with a plurality of filter stages.

Figure 7:
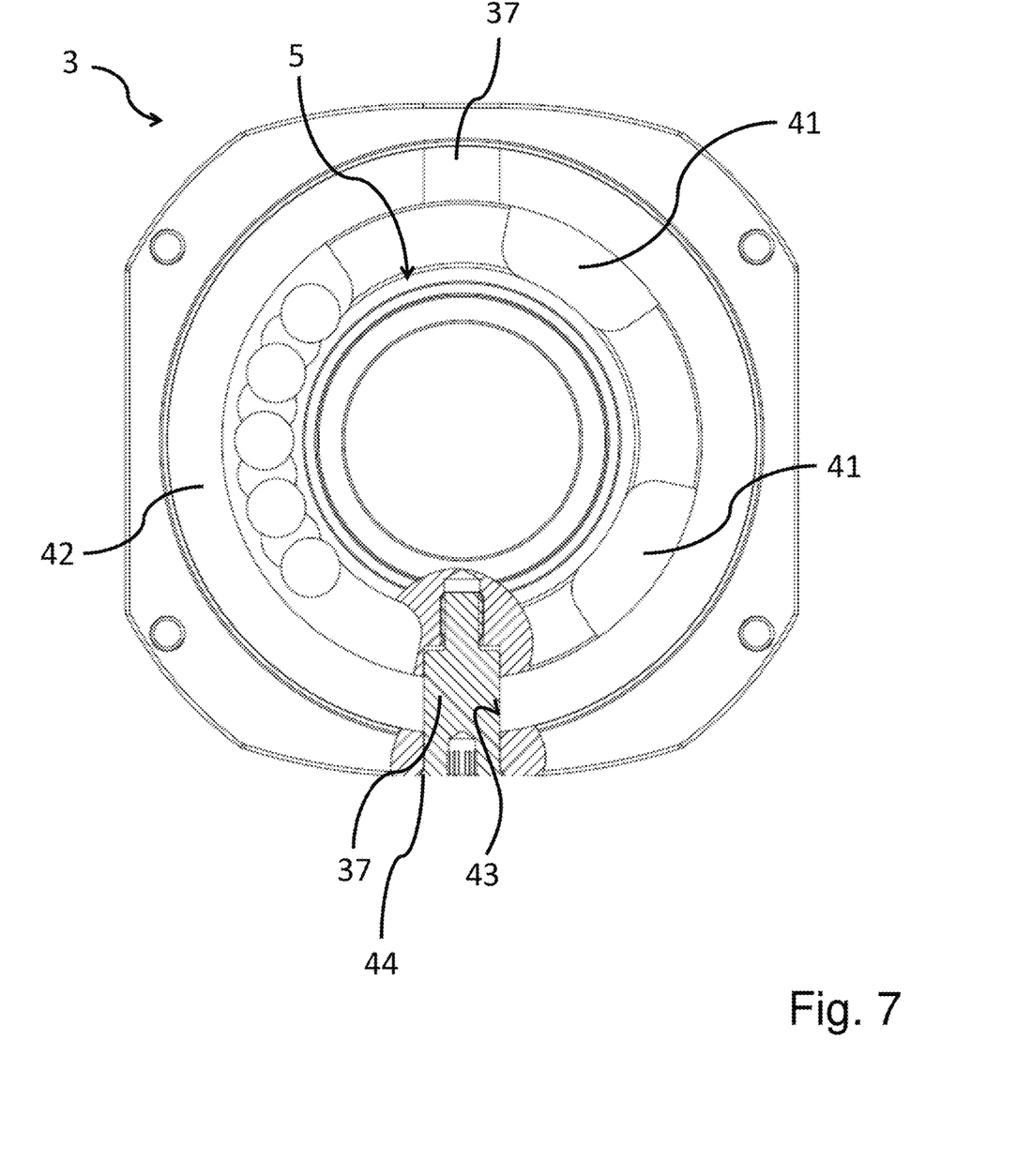
FIG. 7 shows a partial section of a view of a filter head from below.

The filter element 2 shown comprises a substantially tubular body 27 having an annular end side 21 that faces a filter head 3 shown, inter alia, in FIG. 1 and FIG. 7. Furthermore, the filter element 2 has a lower side 28 which is spaced apart from the end side 21 and faces away from the filter head 3. In addition, the filter element 2 has a circumferential face 29 which extends along a central axis 18, in particular a rotation axis. As can be seen, the circumferential face 29 connects the end side 21 and the lower side 28 to one another. Furthermore shown in the region of the end side 21 are a plurality of, preferably three, particularly preferably four, holding arms 30 that run radially to the central axis 18. There is an annular filter element sealing face 6 on the end side 21. The holding arms 30 project in relation to the filter element sealing face 6 and/or in relation to the end side 21.

The holding arms 30 are substantially L-shaped. Moreover, the holding arms 30 project outwards in the axial direction and in the radial direction relative to the filter element sealing face 6 and/or the end side 21, wherein the holding arms 30 project radially outwards from the circumferential face 29.

As can likewise be seen from FIG. 5, the holding arms 30 are fixedly connected to the filter element sealing face 6, preferably configured so as to be integral to the filter element sealing face 6.

It is also shown that the holding arms 30 have in each case a support face 47 which points in the opposite direction of the filter element sealing face 6. The support face 47 is curved so as to be convex. The convex curvature of the support faces 47 here extends in the axial direction to the central axis 18, wherein the support faces 47 adjoin the free ends of the holding arms 30, preferably the end sides 49, and have a length of at least 2 millimeters and a maximum of 8 millimeters in the radial direction. A length between 3 and 6 millimeters is particularly advantageous. Such dimensions permit the easy removal of the filter element 2 and at the same time offer a sufficient support face 47 as a counter bearing to the receptacle installations 36.

The holding arms 30 have an end face 49 which is situated at that exposed end of the holding arms 30 that points radially away from the circumferential face 29 and thus away from the central axis 18. The spacing between the center of the filter element sealing face 6 and an end face 49 in the radial direction to the central axis 18 here is between 12 and 18 millimeters. A spacing between the end faces 49 and the center of the filter element sealing face 6 of between 14 and 16 millimeters is particularly advantageous. The spacing between the filter element sealing face 6 and the beginning of the support faces 47 in the axial direction is between 0 and 4 millimeters, preferably between 1 and 2 millimeters.

The filter element 2 is designed in such a manner that substantially only axial forces act on the filter element sealing face 6. The holding arms 30 form a counter bearing 50 in relation to the axial forces that are created as a result of the compression of the sealing member 4 shown in FIG. 1, the latter bearing on the filter element sealing face 6.

Figure 6:
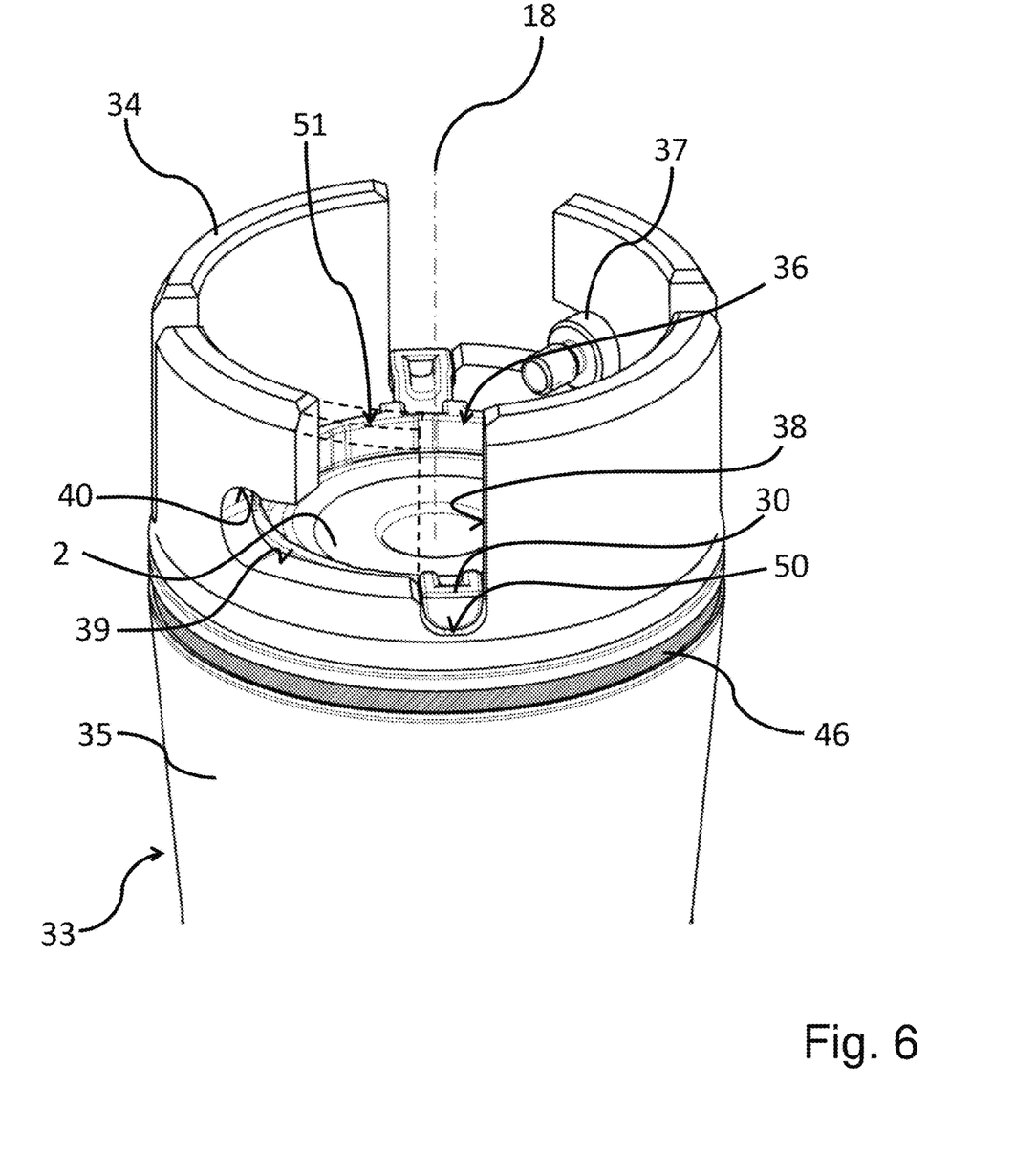
FIG. 6 shows a perspective view of a filter sleeve having a filter element.

It is of particular advantage that the holding arms 30 are flexible in the axial direction and thus form a compensation element between the sealing member 4 bearing on the filter element sealing face 6 and the receptacle installations 36 shown in FIG. 6. The receptacle installations 36 receive the holding arms 30.

The filter element 2 at the transition between the holding arms 30 and the circumferential face 29 has centering ramps 48 which have an angle of between 70° and 5° in relation to the central axis 18 and from the circumferential face 29 extend in the direction of the holding arms 30. It is particularly advantageous if the angle between the circumferential face 29 and the centering ramps 48 is between 20° and 40°. The centering ramps 48 connect the circumferential face 29 and the support faces 47 to one another, wherein the centering ramps 48 serve to center the filter element 2 in the surrounding filter sleeve 33.

FIG. 6 shows a substantially tubular filter sleeve 33 having a filter element 2, wherein the filter sleeve 33 has an open filter sleeve end side 34 that faces the filter head 3 and a filter sleeve outside 35 running along the lateral surface. The filter sleeve 33 surrounds the filter element 2 and delimits the interior of the filter from the environment. The filter sleeve end side 34 has receptacle installations 36 for the holding arms 30, wherein the filter element 2 is in contact with the filter sleeve 33 only by way of the holding arms 30 disposed in the receptacle installations 36 and is otherwise freely suspended in the filter sleeve 33.

The receptacle installations 36 are formed at least by continuous axial incisions 38 which begin at the filter sleeve end side 34 and run radially to the central axis 18, the receptacle installations 36 receiving the holding arms 30. The ends of the incisions 38 form counter bearings 50 which are concave in shape to match the convex support faces 47 of the holding arms 30, wherein the counter bearings 50 absorb the compression force which is created as a result of the compression of the sealing member 4.

Figure 8:
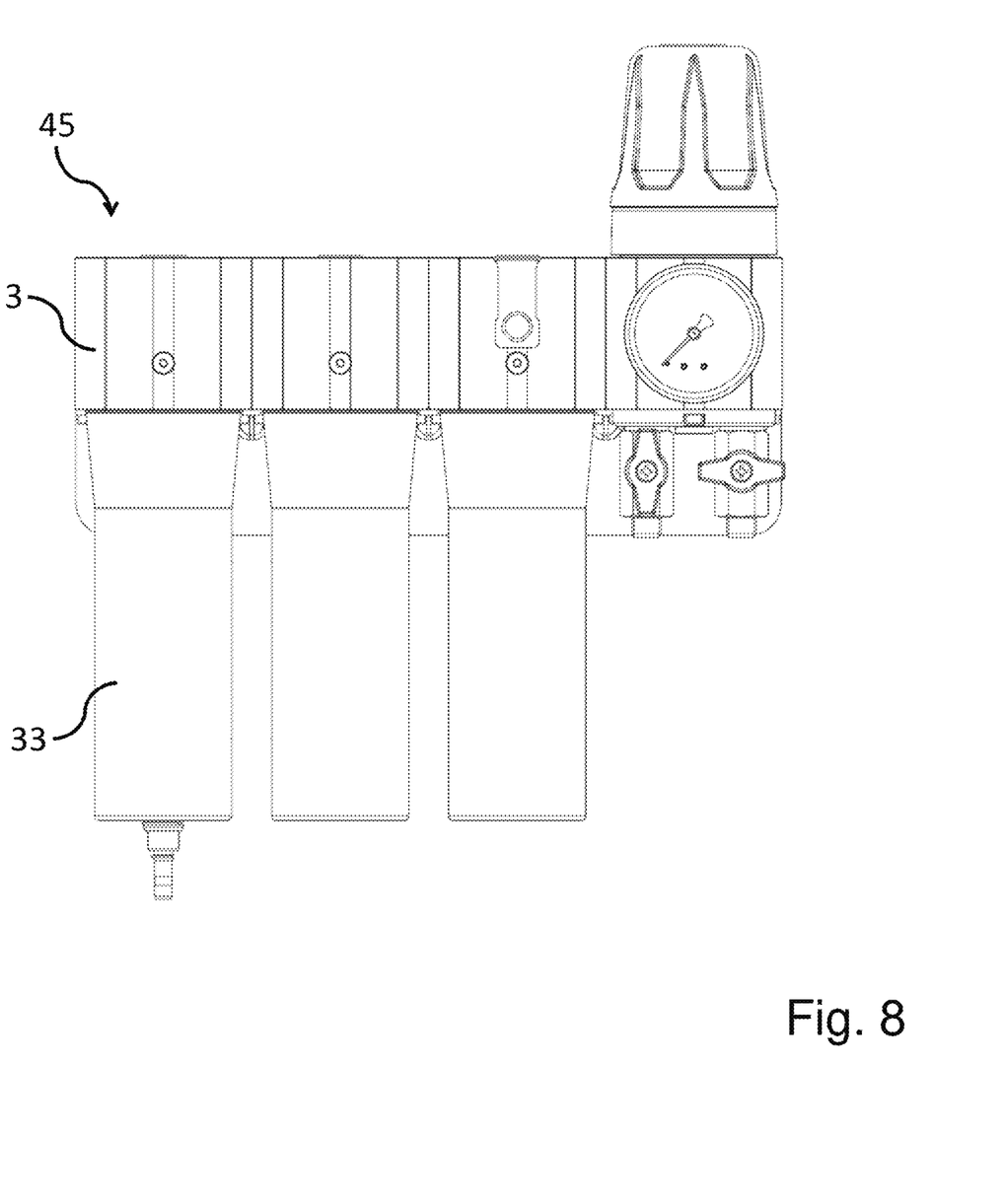
FIG. 8 shows a lateral view of a multi-stage filter.

Two of the receptacle installations 36 are designed as receptacle locking installations 51 which serve to receive the holding arms 30 and the retaining bolts 37 shown in FIG. 8. The retaining bolts 37 are attached to the filter head 3 and aligned radially to the central axis 18. The receptacle locking installations 51 are designed in such a manner that the retaining bolts 37 interact with the receptacle locking installations 51 in the manner of a bayonet closure.

In addition to the axial incisions 38, the receptacle locking installations 51 have a fastening extension 39, wherein the fastening extension 39 is formed by an additional incision that starts from the axial incisions 38 and runs substantially in the circumferential direction about parts of the filter sleeve 33. The fastening extension 39 furthermore has a latching undercut 40 which is formed by a concavity in the end region of the fastening extension 39 proximal to the filter head.

Shown from below in FIG. 7 is a filter head 3, wherein the filter sleeve 33 and the filter element 2 are not shown. The filter head 3 has a filter head sealing face 5 on which the sealing member 4 shown in FIGS. 1 to 3 bears. As can be derived from the drawing, holding arm recesses 41 which are set back in relation to the filter head sealing face 5 are provided, wherein the holding arms 30 in the assembled state extend into the holding arm recesses 41.

The filter head 3 also has a hollow-cylindrical filter sleeve end side recess 42 which from the filter head sealing face 5 in a substantially axially symmetrical manner to the central axis 18 extends into the filter head 3 and, in the assembled state, receives the filter sleeve end side 34, wherein the filter sleeve end side recess 42 in the radial direction to the central axis 18 is situated outside the filter head sealing face 5.

The filter head 3 moreover has two retaining bolt bores 43, which run radially to the central axis 18 and are preferably opposite one another, wherein the retaining bolt bores 43 receive retaining bolts 37 which preferably interact with the receptacle installations 36 in the filter sleeve 33 from FIG. 6 in the manner of a bayonet closure, preferably wherein a metal-on-metal cone seal 44 is provided between the retaining bolts 37 and the filter head 3.

Shown in FIG. 8 is a multi-stage filter 45 having a plurality of filter stages, wherein the filter stages additionally or alternatively to the sealing arrangement 1 and/or the filter element 2 comprise features described above. Here, the multi-stage filter 45 includes, inter alia, filter elements 2 having different filter properties.

In such a multi-stage filter 45, the sealing arrangements 1 for sealing between the filter elements 2 and the filter heads 3 and/or the receptacle installations 36 of the filter sleeves 33 and/or the holding arms 30 of the filter elements 2 can be designed so as to be substantially identical to one another in accordance with the above features. Moreover, at least one of the filter elements 2 can be pressurized from the outside with higher pressure than from the inside, wherein at least one of the filter elements 2 is pressurized in reverse.

The invention claimed is:

1. A filter element comprising a substantially tubular body, an annular end side facing a filter head, a lower side spaced apart from the annular end side and facing away from the filter head, and a circumferential face extending along a central axis,
- wherein the circumferential face connects the annular end side and the lower side to one another,
- wherein a plurality of holding arms running radially to the central axis are arranged in a region of the annular end side,
- wherein a filter element sealing face is arranged on the annular end side,
- wherein the plurality of holding arms projects in relation to the filter element sealing face and in relation to the annular end side,
- wherein the plurality of holding arms projects outwardly in an axial direction and in a radial direction in relation to the filter element sealing face,
- wherein the plurality of holding arms projects radially outwardly on the circumferential face, and
- wherein each holding arm of the plurality of holding arms has a convexly shaped support face pointing in a direction opposite the filter element sealing face.

2. The filter element of claim 1, wherein each holding arm of the plurality of holding arms is substantially L-shaped.

3. The filter element of claim 1, wherein the plurality of holding arms is fixedly connected to the filter element sealing face.

4. The filter element of claim 1, wherein spacing in the axial direction between the filter element sealing face and the convexly shaped support faces is between 0 and 4 millimeters.

5. The filter element of claim 1, wherein each holding arm of the plurality of holding arms has an end face arranged at an exposed end of the respective holding arm that points away from the circumferential face in the radial direction and wherein spacing in the radial direction between a center portion of the filter element sealing face and the end face is between 12 and 18 millimeters.

6. The filter element of claim 1, wherein the filter element is designed such that substantially only axial forces act on the filter element sealing face, wherein the plurality of holding arms form a counter bearing in relation to the axial forces, and wherein the plurality of holding arms is flexible in the axial direction and forms a compensation element between a sealing member bearing on the filter element sealing face and receptacle installations which receive the plurality of holding arms.

7. A filter having a filter head, a filter sleeve, a filter element, a sealing member, the sealing member bearing against an annular filter element sealing face of the filter element such that the sealing member between the filter head and the filter element separates an external space, which is situated outside of the filter element and within the filter sleeve, from an internal space, which is situated within the filter element, and
- a sealing arrangement configured for fluid-tight sealing between the filter head and the filter element,
- wherein the sealing arrangement, in addition to the sealing member and the annular filter element sealing face, includes a filter head sealing face,
- wherein the sealing member has a filter head side that faces the filter head sealing face, an opposite filter side that faces the annular filter element sealing face, an internal face encircling an inside, and an opposite external face encircling a shell face,
- wherein the filter head sealing face and the annular filter element sealing face are composed of at least one encircling inner partial face and one encircling outer partial face, and
- wherein the sealing arrangement is configured such that, when impinged with pressure, the sealing member, proceeding from at least one of the internal face and the external face, in a direction of an acting force, is wedged between at least one of the encircling inner partial face and the encircling outer partial face.

8. The filter of claim 7, wherein the filter sleeve is substantially tubular and includes an open filter sleeve end side that faces the filter head and a filter sleeve outside running along a lateral surface, wherein the filter sleeve surrounds the filter element and delimits the filter element from an outside environment, wherein the open filter sleeve end side has receptacle installations for holding arms, wherein the filter element is in contact with the filter sleeve only by way of the holding arms disposed in the receptacle installations and is otherwise freely suspended within the filter sleeve.

9. The filter of claim 8, wherein the receptacle installations are formed at least by continuous incisions which begin on the open filter sleeve end side and run radially to a central axis, wherein the receptacle installations are configured to receive the holding arms, wherein ends of the continuous incisions form counter bearings which are convex in shape to match concave support faces, wherein the counter bearings absorb compression force which is created as a result of compression of the sealing member.

10. The filter of claim 7, wherein the sealing member is an axially acting seal and wherein the filter sleeve radially seals toward the filter head.

11. The filter of claim 8, wherein at least two of the receptacle installations are configured as receptacle locking installations which serve to receive the holding arms and retaining bolts, which are at least one of attached to the filter head and aligned radially to a central axis, wherein the receptacle locking installations are configured such that the retaining bolts interact with the receptacle locking installations as a bayonet closure.

12. The filter of claim 11, wherein the receptacle locking installations, in addition to axial incisions, have a fastening extension, wherein the fastening extension is formed by further incision that starts from the axial incisions and runs substantially circumferentially around parts of the filter sleeve, wherein the fastening extension has a latching undercut which is formed by a concavity in an end region of the fastening extension proximal to the filter head.

13. The filter of claim 7, wherein the sealing member is annular and elastic.

14. The filter of claim 8, comprising at least two filter stages, each filter stage having filter head, a filter sleeve, and a filter element, wherein sealing arrangements for sealing between the filter elements and the filter heads, the receptacle installations of the filter sleeves, and the holding arms of the filter elements of the at least two filter stages are substantially of identical design.

15. A filter having a filter head, a filter sleeve, a filter element, and
- a sealing member, the sealing member bearing against an annular filter element sealing face of the filter element such that the sealing member between the filter head and the filter element separates an external space, which is situated outside of the filter element and within the filter sleeve, from an internal space, which is situated within the filter element, wherein the filter sleeve is substantially tubular and includes an open filter sleeve end side that faces the filter head and a filter sleeve outside running along a lateral surface, wherein the filter sleeve surrounds the filter element and delimits the filter element from an outside environment, wherein the filter sleeve end side has receptacle installations for holding arms, wherein the filter element is in contact with the filter sleeve only by way of the holding arms disposed in the receptacle installations and is otherwise freely suspended within the filter sleeve, wherein at least two of the receptacle installations are configured as receptacle locking installations which serve to receive the holding arms and retaining bolts, which are at least one of attached to the filter head and aligned radially to a central axis, and wherein the receptacle locking installations are configured such that the retaining bolts interact with the receptacle locking installations as a bayonet closure.

16. The filter of claim 15, wherein the receptacle locking installations, in addition to axial incisions, have a fastening extension, wherein the fastening extension is formed by a further incision that starts from the axial incisions and runs substantially circumferentially around parts of the filter sleeve, wherein the fastening extension has a latching undercut which is formed by a concavity in an end region of the fastening extension proximal to the filter head.

17. A filter element secured in a filter sleeve by a plurality of holding arms, the filter element comprising:

a filter element having a substantially tubular body, an annular end side facing a filter head, a lower side spaced apart from the annular end side and facing away from the filter head, and a circumferential face extending along a central axis, wherein the circumferential face connects the annular end side and the lower side to one another, wherein the plurality of holding arms run radially to the central axis and is arranged in a region of the annular end side, wherein a filter element sealing face is arranged on the annular end side, wherein the plurality of holding arms projects in relation to the filter element sealing face and in relation to the annular end side, wherein the plurality of holding arms projects outwardly in an axial direction and in a radial direction in relation to the filter element sealing face, wherein the plurality of holding arms projects radially outwardly on the circumferential face, wherein each holding arm of the plurality of holding arms has a convexly shaped support face pointing in a direction opposite the filter element sealing face;

wherein a substantially tubular filter sleeve surrounds the filter element, and wherein the plurality of holding arms engages receptacle installations arranged in an end side of the substantially tubular filter sleeve, thereby securing the filter element therein.

* * * * *